US007630062B2

(12) United States Patent
Mori et al.

(10) Patent No.: US 7,630,062 B2
(45) Date of Patent: Dec. 8, 2009

(54) DISTANCE MEASURING APPARATUS

(75) Inventors: Toshihiro Mori, Takatsuki (JP); Masanori Hino, Osaka (JP)

(73) Assignee: Hokuyo Automatic Co., Ltd., Osaka (JP)

( * ) Notice: Subject to any disclaimer, the term of this patent is extended or adjusted under 35 U.S.C. 154(b) by 0 days.

(21) Appl. No.: 11/898,421

(22) Filed: Sep. 12, 2007

(65) Prior Publication Data

US 2008/0068584 A1 Mar. 20, 2008

(30) Foreign Application Priority Data

Sep. 14, 2006 (JP) .............................. 2006-250064

(51) Int. Cl.
*G01C 3/08* (2006.01)

(52) U.S. Cl. .................................................. 356/5.01

(58) Field of Classification Search ........ 356/5.01–5.15
See application file for complete search history.

(56) References Cited

U.S. PATENT DOCUMENTS

| 3,125,693 | A | * | 3/1964 | De Clue ...................... 250/206 |
| 4,188,551 | A | * | 2/1980 | Iwasaki et al. .............. 396/228 |
| 4,505,582 | A | * | 3/1985 | Zuleeg et al. .............. 356/5.05 |
| 4,952,795 | A | * | 8/1990 | Gauthier et al. ......... 250/214 A |
| 5,949,530 | A | | 9/1999 | Wetteborn |
| 7,088,433 | B1 | * | 8/2006 | Kato ......................... 356/5.01 |
| 7,202,941 | B2 | * | 4/2007 | Munro ....................... 356/5.01 |
| 2003/0103197 | A1 | * | 6/2003 | Shirai et al. ................ 356/5.01 |
| 2005/0110976 | A1 | * | 5/2005 | LaBelle ...................... 356/5.01 |
| 2005/0146705 | A1 | * | 7/2005 | Lei et al. .................... 356/5.01 |
| 2008/0094201 | A1 | * | 4/2008 | Paradiso et al. ............. 340/505 |

FOREIGN PATENT DOCUMENTS

| JP | 07-128438 | 5/1995 |
| JP | 10/020035 | 1/1998 |

* cited by examiner

*Primary Examiner*—Isam Alsomiri
(74) *Attorney, Agent, or Firm*—Pillsbury Winthrop Shaw Pittman, LLP

(57) ABSTRACT

A distance measuring apparatus, which can attain a distance compensation of a high precision and can be stably operated by using a cheap circuit, without any arrival at a supersaturated state for a great reflected light intensity, while a gain of an amplifying circuit is made higher, in order to accurately detect even a weak reflected light. The apparatus comprises: a light source for outputting a pulsed measurement light towards a measurement target object; a light receiver for detecting the reflected light from the measurement target object; and a calculator for calculating the distance from the measurement target object on the basis of the delay time between the output timing of the measurement light and the detected timing of the reflected light by the light receiver, and a light receiver 5 is composed of a photodiode PD for photoelectrically converting the reflected light, a diode D that is connected in series to the photodiode PD and clamps the light current generated in the photodiode PD, and an amplifying circuit 50 for amplifying the output of the photodiode PD, and it contains an integration processor for integrating the output of the amplifying circuit 50 and a distance compensator for compensating the distance in accordance with the output of the integration processor.

5 Claims, 13 Drawing Sheets

DISTANCE MEASURING APPARATUS

CROSS REFERENCE TO RELATED APPLICATIONS

This application claims the benefit of priority of Japanese Patent Application No. 2006-250064, filed in Japan on Sep. 14, 2006, the entire contents of which are incorporated herein by reference.

BACKGROUND OF THE INVENTION

1. Field of the Invention

The present invention relates to a distance measuring apparatus based on a TOF (Time of Flight) method, which drives a light source, such as a semiconductor laser, a light emission diode or the like, and emits a pulse-shaped measurement light to a measurement target object and then detects a reflected light from the measurement target object and in accordance with a flight time (delay time) of the light between an output timing of the measurement light and a detection timing of the reflected light, and consequently measures the distance between the light source and the measurement target object.

2. Description of the Related Art

This type of distance measuring apparatus is used in a visual sensor of a robot or an automatic guided vehicle, or an opening/closing sensor of a door or a monitor sensor for detecting a presence or absence of a raider to a monitor region, or a safety sensor for detecting a person or an object who approaches a dangerous equipment and safely stopping a machine, and the like. As shown in FIG. 12A and FIG. 12B, this is provided with: a light source 110 for outputting a pulsed measurement light towards a measurement target object 100; a light receiver 120 for detecting a reflected light from the measurement target object 100; a time difference detector 130 for detecting a delay time between the output timing of the measurement light and the detection timing of the reflected light by the light receiver 120; and a calculator 140 for calculating the distance to the measurement target object on the basis of the delay time detected by the time difference detector 130.

Specifically, a distance L between the light source and the measurement target object is calculated on the basis of an (Formula 1) with regard to a flight time $\Delta t$ of the light and a light speed C.

$$L = \Delta t \cdot C/2 \quad \text{(Formula 1)}$$

In the time difference detector, as shown in FIG. 13A, the reflected wave detected by the photodiode is amplified by the amplifying circuit, and a rise edge in which a reflected signal serving as that output signal is converted into a binary signal with respect to a predetermined threshold V is determined as the detection timing of the reflected light. However, as shown in FIG. 13A, even if the light source and the measurement target object are located at the same distance, a surface reflectance of the measurement target object causes a reflected light intensity to be different. Thus, this has a problem that, since a variation is generated in the rise edge of the reflected signal, this variation occurs as the error of the calculated distance.

Japanese Unexamined Patent Publication No. H07-128438A discloses a technique which in order to compensate the error, determines in advance a compensation value corresponding to the peak value of the reflected signal and compensates the delay time detected by the time difference detector on the basis of the compensation value and consequently removes the influence of the error.

The compensation for the delay time based on the peak value is only the compensation technique that is allowable only under the non-saturation condition where the amplifying circuit indicates a linear output property. As shown in FIG. 13B, when the intensity of the reflected light becomes great and the amplifying circuit is supersaturated, this has a problem that the accurate peak value cannot be obtained, thereby making the compensation impossible.

In order to enlarge the detection range of the measurement target object, if the gain of the amplifying circuit is increased so as to accurately detect even the weak reflected light, it is impossible to avoid the amplifying circuit from being supersaturated for the great-reflected light intensity. Depending on the degree of the super-saturation, the waveform is severely disturbed.

So, Japanese Unexamined Patent Publication No. H10-20035A discloses a technique where as shown in FIG. 13C, in addition to an amplifying circuit 210 for amplifying an output of a photodiode 200 for photo-electrically converting the reflected light and a comparator 220 for converting an output of the amplifying circuit 210 into a binary value, a Schottky diode 230 and a condenser 240, which are connected in series to the photodiode 200, and an amplifying circuit 250 having a small gain, which is connected following the condenser 240, are used to measure the amount of all charges flowing through the photodiode 200 during the reception of the reflected lights, and the delay time is compensated in accordance with that value.

However, the compensation technique described in Japanese Unexamined Patent Publication No. H10-20035A has a problem where, although the distance compensation can be carried out correspondingly to a dynamic range where a reflected light intensity is wide, in order to measure the total charge amount, a different amplifying circuit is required, which results in an expensive part cost, and when the reflected light intensity is small, the linearity of the amplifying circuit is poor, which results in the drop in a compensation precision.

Moreover, when the amplifying circuit becomes supersaturated, a large amount of leakage currents flow into the amplifying circuit. This has an influence on a bias circuit for determining the gains of transistors and FET and the like that serve as the amplifying elements of the circuit and the setting of an operational point. Thus, there is a problem that the distortion and crack of the waveform and the swinging to a minus direction are generated, thereby making the operation unstable.

SUMMARY OF THE INVENTION

In view of the above-mentioned problems, it is therefore an object of the present invention to provide a distance measuring apparatus that can carry out a distance compensation at a high precision under a stable operation in a cheap circuit, without any arrival at a supersaturate state for a great reflected light intensity, while increasing a gain of an amplifying circuit, in order to accurately detect even a weak reflected light.

In order to attain the above-mentioned object, the first feature configuration of the distance measuring apparatus according to the present invention is a distance measuring apparatus which contains: a light source for outputting a pulsed measurement light towards a measurement target object; a light receiver for detecting a reflected light from the measurement target object; a time difference detector for detecting a delay time between an output timing of the measurement light and a detected timing of the reflected light by the light receiver; and a calculator for calculating a distance from the measurement target object on the basis of the delay time detected by the time difference detector, wherein the light receiver is provided with: a photodiode for photo-electrically converting the reflected light; a diode which is connected in series to the photodiode and clamps a light current generated in the photodiode; and an amplifying circuit for amplifying an output of the photodiode, and the distance measurement apparatus further contains an integration processor for integrating an output of the amplifying circuit and contains a distance compensator for compensating the delay time or the distance in accordance with an output of the integration processor.

According to the foregoing configuration, even if the great reflected light intensity causes the increase in the current flowing through the photodiode, this is clamped by the diode. Thus, the output of the amplifying circuit is never saturated, thereby obtaining the output waveform of the level that is always stable.

Then, after the disappearance of the reflected light, the reverse direction current caused by the reverse recovery property of the diode, namely, the diffusion of the minor carriers accumulated inside the junction capacitor of the diode is inputted to the amplifying circuit, and the width of the output waveform of the amplifying circuit is made longer, correspondingly to the value of the reverse direction current. This reverse direction current is proportional to the forward current value, namely, the total electric charge flowing through the photodiode during the reception of the reflected light.

So, a value determined by integrating the output by the integration processor becomes the total electric charge flowing through the photodiode by inputting the reflected light. Thus, the compensator can accurately compensate the delay time or the distance in accordance with the integration value. Hence, there is no necessity of installing the different amplifying circuit to determine the total electric charge flowing through the photodiode.

The second feature configuration is such that in addition to the first feature configuration, the integration processor contains: an AD converter for AD converting the output of the amplifier at a predetermined interval until a reverse recovery time of the diode after a disappearance of the reflected light from the detection of the reflected light; and an adding processor for adding the output of the AD converter.

According to the foregoing configuration, the output of the amplifier until the reverse recovery time of the diode after the disappearance of the reflected light from the detection of the reflected light is AD converted at the predetermined interval, and that value is added, and the integration value is determined.

The third feature configuration is such that in addition to the second feature configuration, the time difference detecting circuit calculates the detection timing of the reflected light in accordance with a rise property of the reflected light that is AD converted by the AD converter.

According to the foregoing configuration, the output of the AD converter to determine the integration value is doubly used to detect the detection timing of the reflected light. Thus, the simple cheap circuit configuration can be attained.

DESCRIPTION OF THE PREFERRED EMBODIMENTS

The embodiment of a scanning type distance measuring apparatus as one example of the distance measuring apparatus according to the present invention will be described below with reference to the drawings.

Figure 1:
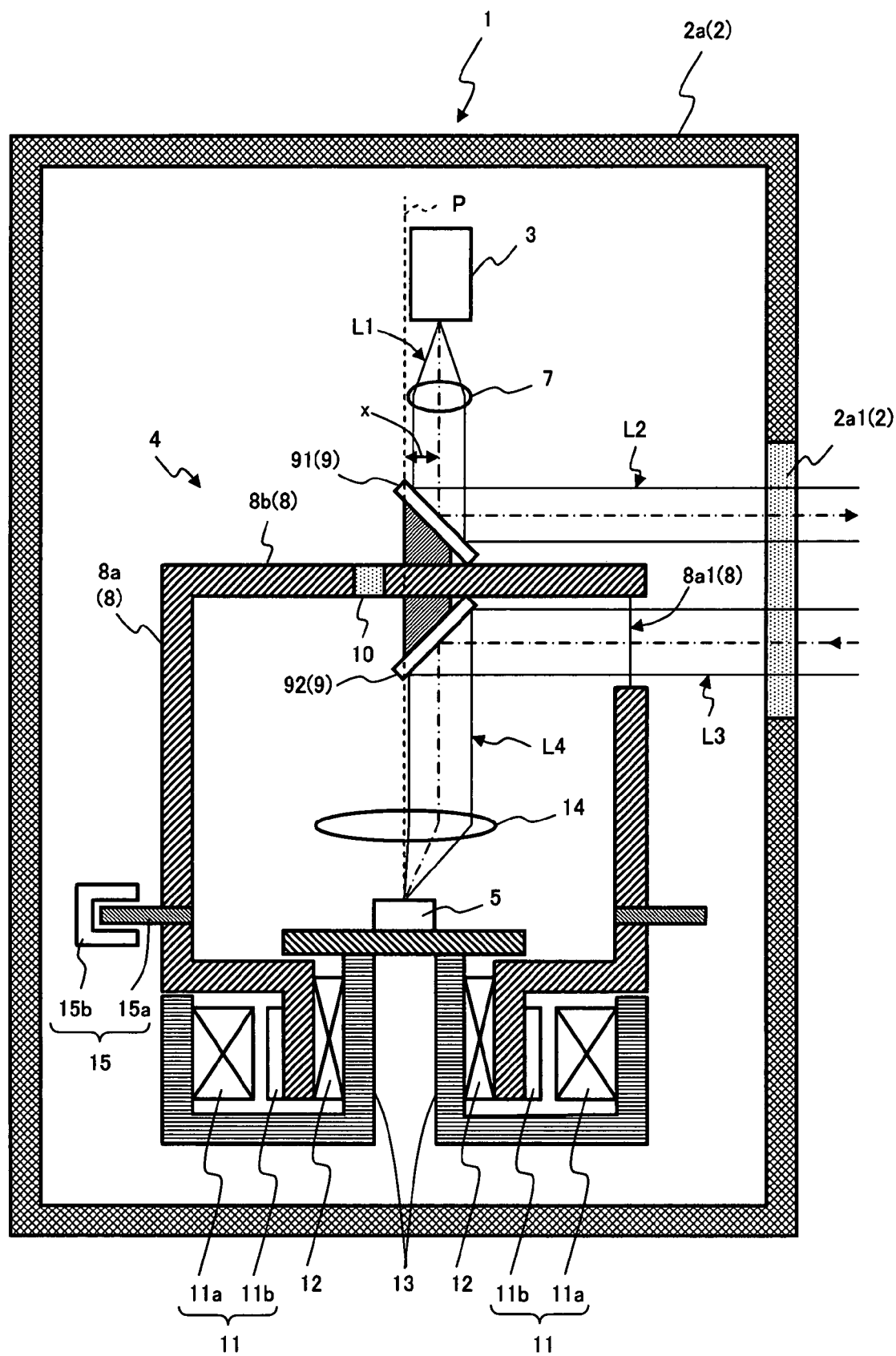
FIG. 1 is a schematic longitudinal sectional view showing an entire configuration of a scanning type distance measuring apparatus according to the present invention.

FIG. 1 is a schematic longitudinal sectional view showing the entire configuration of the scanning type distance measuring apparatus. As shown in FIG. 1, this scanning type distance measuring apparatus 1 contains a housing 2. Also, a light projector 3, a scanner 4 and a light receiver 5 are contained as the main members inside this housing 2.

The housing 2 is cylindrical where both ends of an up/down direction in FIG. 1 is closed, and a light transmitting window 2a1 having a constant width in the up/down direction is formed along the side wall (the right side wall shown in FIG. 1) where a part is removed from the entire circumference of a circumference wall 2a. The measurement light outputted by the light projector 3, which will be described later, and the reflected light which is reflected by a measurement target object and sent to the light receiver 5 can be transmitted and received through this light transmitting window 2a1.

Also, the inner wall of the housing 2 is constituted by a light absorbing wall that is coated with a light absorbing member, such as a black-out curtain whose surface is concave and convex, in order to perfectly shield the light and protect the reflection, except the light transmitting window 2a1.

The light projector 3 is composed of a light emitting device, for example, such as a light emitting diode, or a semiconductor laser or the like; and a circuit for driving the light emitting device. The light emitting device is arranged such that the measurement light is outputted downwardly in FIG. 1. An optical lens 7 for making the beam diameter of the light constant is arranged on a projected light input path L1 through which the measurement light downwardly outputted by this light projector 3 is transmitted.

The scanner 4 scans the measurement light, which is outputted by the light projector 3, in external measurement target space through the light transmitting window 2a1 of the housing 2. This is composed of a rotating body 8, a reflection member 9 for introducing the reflected light from the measurement target object existing in the measurement target space to the light receiver 5, and a motor 11 serving as a rotating mechanism. The rotating body 8 is composed of a cylindrical circumferential wall 8a and a ceiling 8b for closing the top end of the circumferential wall 8a. The bottom end of the circumferential wall 8a is thinned in diameter, and a hollow shaft 13 is inserted through a bearing 12 into the inner surface thereof, and this is rotatably supported by this hollow shaft 13.

The motor 11 for rotationally driving the rotating body 8 is configured such that this contains a coil 11a on a stator side and a magnet 11b on a rotator side, respectively, and the magnet 11b is attached to the outer circumferential surface of the bottom end of the circumferential wall 8a in the rotating body 8, and with the mutual action with the coil 11a, the rotating body 8 rotates the reflection member 9 around a predetermined rotation axis P.

The rotation axis P is set at the position that is separated by a predetermined distance x from the optical axis of the projected light input path L1, as indicated by a dotted line in FIG. 1. In short, the reflection member 9 is designed so as to be rotated around the predetermined rotation axis P.

In the reflection member 9, the light projector 3 and the light receiver 5 are arranged oppositely to each other with the reflection member 9 between, and the reflection member 9 is constituted by a pair of a light projection mirror as a first reflection member 91 for propagating the measurement light outputted by the light projector 3 to the measurement target space and a light reception mirror as a second reflection member 92 for introducing the reflected light from the measurement target object to the light receiver 5.

On the top and bottom surfaces of the ceiling 8b in the rotating body 8, the first reflection member 91 and the second reflection member 92 are attached in reclined poses at the positions of the predetermined distances from the rotation shaft, respectively. The measurement light outputted from the light projector 3 is inputted via the projected light input path L1 to the first reflection member 91 and then reflected and introduced to a horizontal projected light output path L2. Also, the reflected light from the object existing inside the scanning region that is the measurement target space formed outside the housing 2, namely, from the measurement target object is inputted through an opening 8a1 formed in a part of the circumferential wall 8a in the rotating body 8 via a light reception input path L3 to the second reflection member 92, and then reflected and introduced to a light reception output path L4. A light receiving lens 14 is attached onto this light reception output path L4, and the reflected lights from the object are converged to the light receiver 5.

Figure 2:
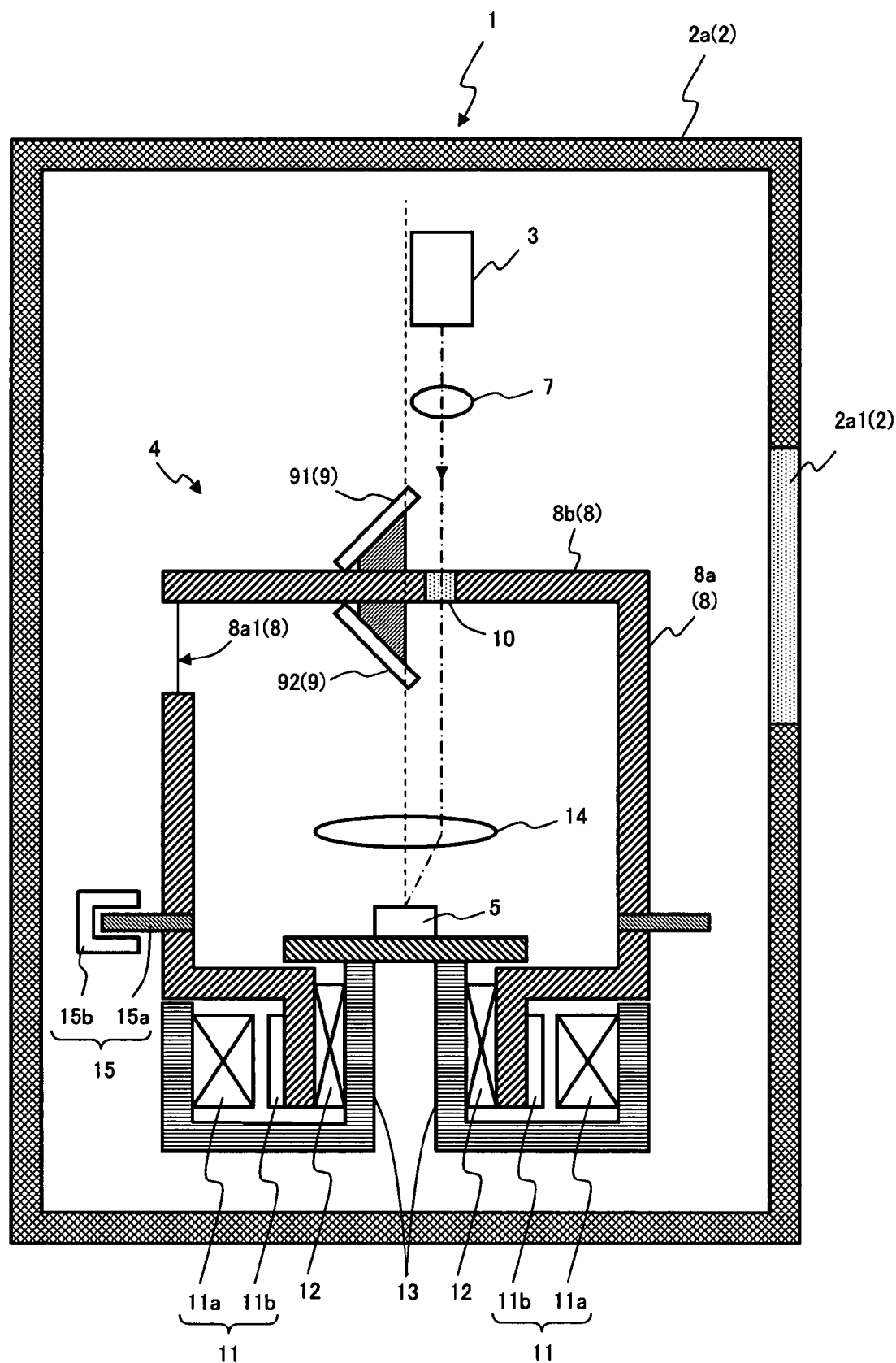
FIG. 2 is a schematic longitudinal sectional view showing the entire configuration at a reference position of the scanning type distance measuring apparatus in FIG. 1.

Also, an opening 10 for introducing the measurement light, which is outputted by the light projector 3, from the top surface of the ceiling 8b to the bottom surface thereof in the rotating body 8 is formed on the side opposite to the optical axis of the measurement light with the rotation axis P of the rotating body 8 between. As shown in FIG. 2, when the rotation of the rotating body 8 causes the opening 10 to be located immediately under the light projector 3, this is designed so as to create a reference optical path through which a part of the measurement light is introduced through the opening 10 to the light receiver 5 without being outputted outside the apparatus as a reference light. A light reduction filter is installed in the opening 10, and the light intensity of the reference light introduced through the reference optical path to the light receiver 5 becomes the constant light intensity.

By the way, in this embodiment, each of the first reflection member 91 and the second reflection member 92 is inclined by 45 degrees relative to the rotation shaft of the rotating body 8, and each of the projected light output path L2 and the light reception input path L3 has the optical axis orthogonal to the optical axis of the projected light input path L1 (the optical axis of the light reception output path L4), and they are installed parallel to each other.

Consequently, the reflected light which is emitted through the projected light output path L2 to the object and reflected therefrom can be acquired from the light reception input path L3. Moreover, a scanning angle detector 15 for detecting a scanning angle of the rotating body 8 is composed of a slit plate 15a having an optical slit fixed to the outer circumference surface of the rotating body 8; and a photo interrupter 15b placed on the rotation route of the slit plate 15a.

The light receiver 5 is configured to detect the reflected light from the measurement target object, and composed of a light receiving element, for example, such as an avalanche photodiode or the like, and an amplifying circuit for amplifying a photo-electrically converted signal, and this is arranged at the position where in the situation that this is accommodated in the rotating body 8, this is opposite to the light projector 3 with a predetermined rotation axis as a center.

In detail, the light receiver 5 is placed on the top end plane of the hollow shaft 13 for supporting the rotating body 8 and configured to always keep the resting state, independently of the rotation operation of the rotating body 8 that is carried out by the motor 11. Also, the output signal from the light receiver 5 is connected to a signal processing circuit, which will be described later, through a signal line inserted into the inner space of the hollow shaft 13, although this is not shown.

When the rotating body 8 is rotated, the measurement light outputted by the light projector 3 is radically scanned with the rotation shaft of the rotating body 8 as a center.

As shown in FIG. 2, when the reflection member 9 is rotated by the rotating body 8 so that the opening 10 comes to the particular rotation position immediately under the light receiver 5 and the optical lens 7, as indicated by an alternate long and short dash line in FIG. 2, a part of the measurement light outputted by the light projector 3 is introduced as a reference light through the opening 10 to the light receiver 5. At this time, this is designed such that, even if the part of the measurement light is inputted to the first reflection member 91, it is absorbed by the light absorbing wall, and stray light is never generated.

In this embodiment, the light transmitting window 2a1 is formed such that the measurement light is externally scanned in the range of about 270 degrees with the rotation shaft as a center. However, if the light transmitting window 2a1 is formed in the range that the measurement light is not outputted to outside when the reference light is introduced through at least the opening 10 to the light receiver 5, this can be configured so as to be able to be scanned in the range of 270 degrees or more.

The signal processing circuit for calculating the distance from the measurement target object in accordance with the delay time between the output timing of the measurement light and the detection timing of the reflected light by the light receiver 5 will be described below.

Figure 3:
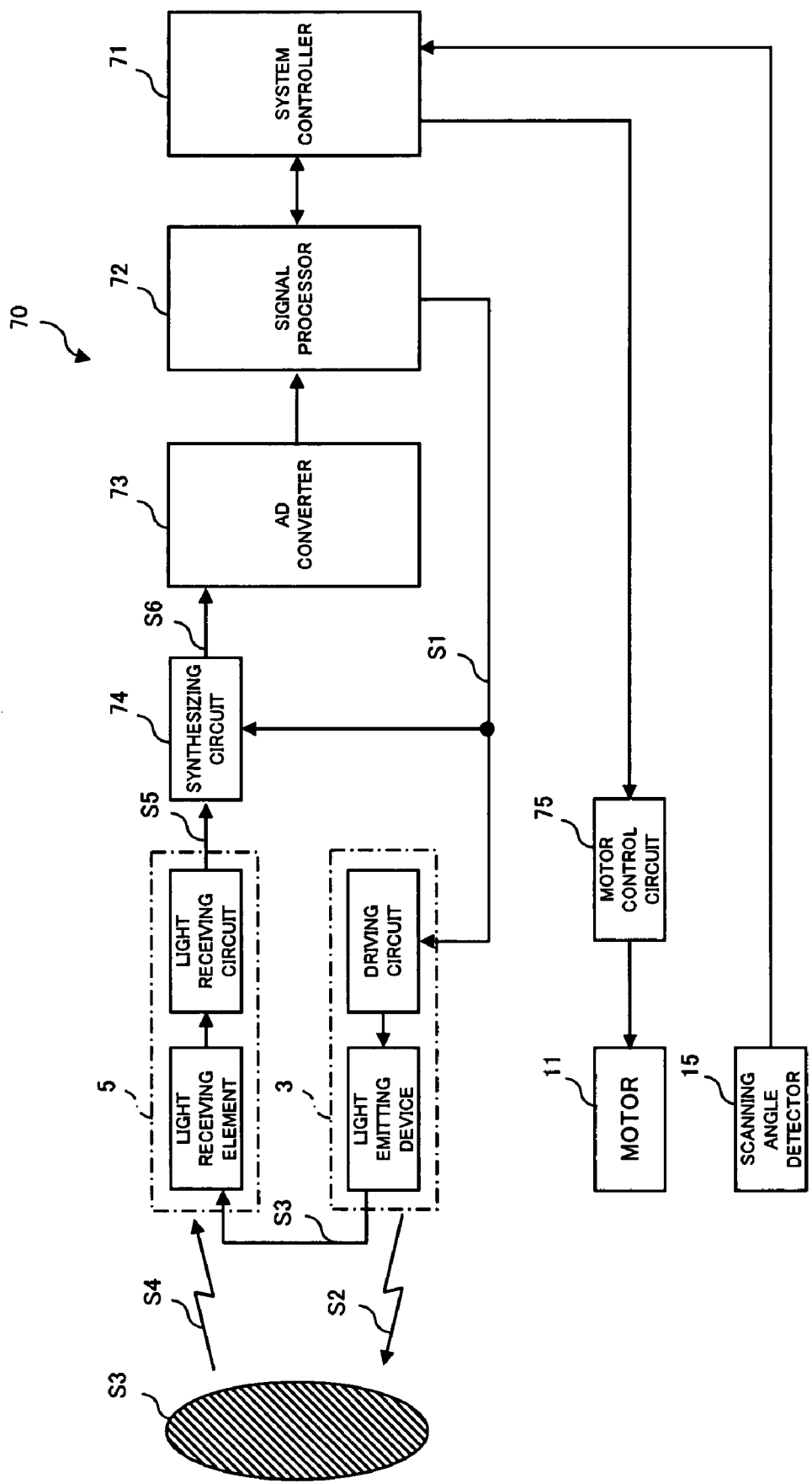
FIG. 3 is a block configuration view of a signal processing circuit of a scanning type distance measuring apparatus according to the present invention.

As shown in FIG. 3, a signal processing circuit 70 is provided with: the light projector 3 for emitting the measurement light to a measurement target object 100; the light receiver 5 for receiving the reflected light from the measurement target object 100; a synthesizing circuit 74 for synthesizing a drive signal to generate the measurement light and an analog reflected signal corresponding to the reflected light detected by the light receiver 5; an AD converter 73 for converting the synthesized analog signal into a digital signal; a signal processor 72 constituted by a digital calculating circuit for calculating the time difference between the output timing of the measurement light and the detection timing of the reflected light, in accordance with the digital signal converted by the AD converter 73; a system controller 71 that contains a CPU for controlling the entire system and calculating the distance information in accordance with the time difference calculated by the signal processor 72; and the like.

The light projector 3 contains: a light emitting device 3a that uses the semiconductor laser as a light source as mentioned above; and a drive circuit 3b for driving the light emitting device 3a and outputting a pulsed measurement light of several nano-seconds.

The light receiver 5 contains: a light receiving element 5a constituted by an avalanche photodiode PD for photo-optically converting the reflected light; and a light receiving circuit 5b having a transformation impedance amplifying circuit for impedance-converting and amplifying the reflected signal photo-electrically converted by the light receiving element 5a.

Figure 4A:
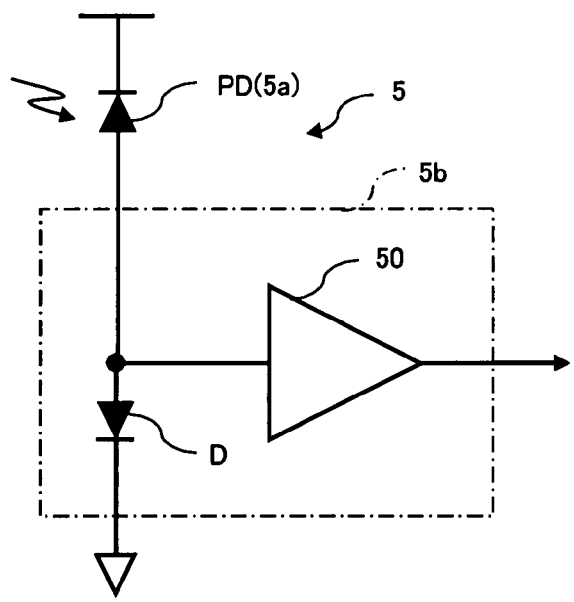
FIG. 4A is a configuration view of a light receiving circuit.

As shown in FIG. 4A, in the light receiving circuit 5b, a diode D is connected forwardly in series to an anode of the avalanche photodiode PD (5a) where a high power source voltage is applied to a cathode, and a connection point between them is inputted to a transformation impedance amplifying circuit 50. The cathode of the diode D is grounded. Then, since the light current generated in the avalanche photodiode PD by the reflected light is clamped, this is configured to be stably amplified in the non-saturated state indicating the linear property in the situation that the transformation impedance amplifying circuit 50 is not supersaturated.

There are various reflected light intensity, depending on the distance from the measurement target object and the surface reflectance of the measurement target object. Thus, correspondingly to them, it is difficult to set the dynamic range of the transformation impedance amplifying circuit 50. So, in such a way that even if the reflected light intensity is great, the transformation impedance amplifying circuit 50 is not supersaturated, the current flowing through the avalanche photodiode PD (5a) is clamped by the diode clamping circuit.

When the reflected light is lost and the avalanche photodiode PD (5a) is turned off, the opposite direction current caused by the diffusion of the minor carriers accumulated in the junction capacitor of the diode D with the reverse recovery property is inputted to the transformation impedance amplifying circuit 50.

In short, when the light current flowing from the avalanche photodiode PD (5a) becomes great, the forward current of the diode D becomes great, and with the square property of the diode, the voltage proportional to the voltage between both ends of the diode is outputted to the output side of the transformation impedance amplifying circuit 50. In this case, the transformation impedance amplifying circuit 50 is not supersaturated and continues the stable operation. However, the output voltage is not linear for the flowing current value, and this exhibits the reverse square property.

Next, when the light is not inputted to the avalanche photodiode PD (5a), the light current does not flow. Thus, the forward voltage applied to the diode D becomes 0. At that time, the charges accumulated in the junction capacitor inside the diode D are diffused into the diode during the reverse recovery time and flows in the opposite direction. The charge amount is proportional to the forward current value. The current flowing in the opposite direction is amplified by the transformation impedance amplifying circuit 50, and its output signal S5 becomes the signal as if it is more extended than the pulse width of a reflected light S4.

When this manner is explained with reference to FIG. 4B, for the reflected lights S4 (S40, S41, S42, S43 and S44) having the different intensity that are inputted to the avalanche photodiode PD (5a), the transformation impedance amplifying circuit 50 outputs the reflected signals S5 (S50, S51, S52, S53 and S54) corresponding to the respective intensities, and as the intensity of the reflected light S4 becomes greater, the signal width of the reflected signal S5 becomes longer.

Since the reflected signal S5 is integrated by an integrating process which will be described later, the signal value corresponding to the light current generated in the avalanche photodiode PD (5a) is obtained by the reflected light S4.

Figure 4B:
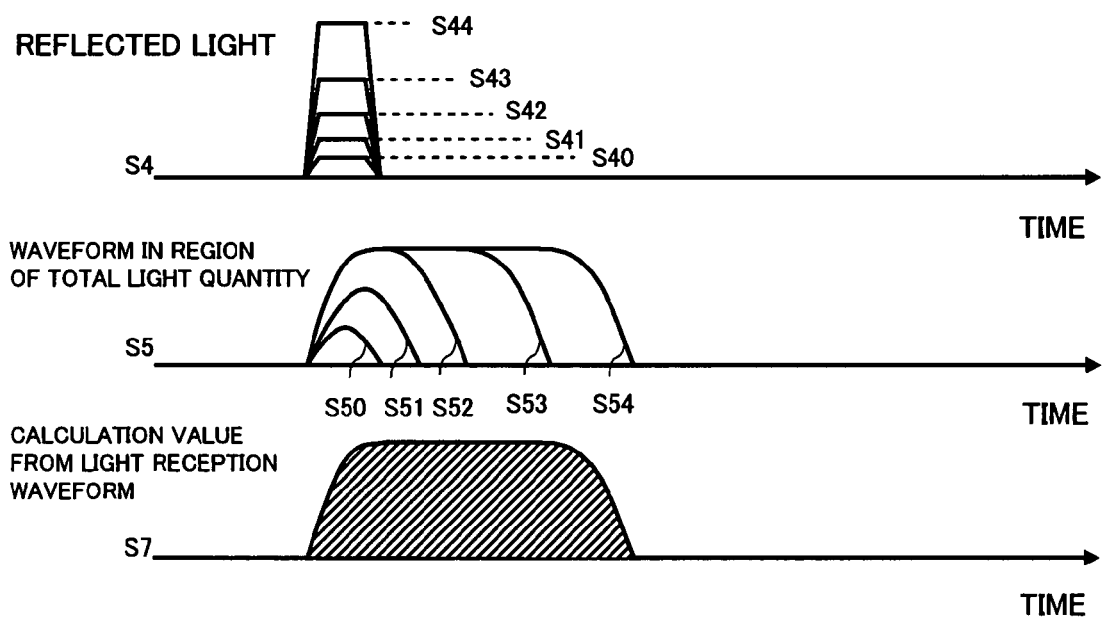
FIG. 4B is an operation explanation view of the light receiving circuit.

An integration value S7 of a light reception wavelength shown in FIG. 4B indicates the value where the integration range (the hatched range) of a reflected signal S54 outputted by the transformation impedance amplifying circuit 50 for a reflected light S44 is integrated.

The properties of the output current, forward current and reverse recovery time inside the reverse recovery time of the diode D is represented by (Formula 2).

$$Toff = (If/Ir) * X^2/2\, Dp \quad \text{(Formula 2)}$$

Where, Toff indicates the reverse recovery time, If indicates the forward current, Ir indicates the opposite current, x indicates a pn junction distance of the diode, and Dp indicates a diffusion coefficient of the minor carrier.

The light current If corresponds to the peak value of the light reception waveform and is proportional to Toff×Ir. The Ir corresponds to the opposite current of the diode, and the Toff corresponds to its width. Thus, the multiplication value between both of them becomes the waveform integration value.

Typically, the diode whose reverse recovery time is great is said to be the diode whose switching property is poor. For example, in the case of the Schottky diode or first recovery diode whose switching property is excellent, the reverse recovery time is similar to 0. Those diodes faithfully respond to the change in the signal. However, they cannot be used because the clamped light current cannot be detected in the present invention. If the diode having the suitable reverse recovery property, for example, an usual silicon diode whose reverse recovery time is about ten-odd nanoseconds is connected, the current based on the square property of the diode flows into the ground while the light current flows, and when the light current stops, the signal waveform whose pulse width is long extended because of the reverse recovery time proportional to the light current value is obtained.

A motor control circuit 75 for driving the motor 11 and the scanning angle detector 15 are connected to the system controller 71.

When the system is turned on, the system controller 71 outputs a motor drive signal to the motor control circuit 75. Then, the motor 11 is driven at a predetermined speed by the motor control circuit 75. In association with the rotational drive of the motor 11, the pulse signal outputted by the scanning angle detector 15 is inputted to the system controller 71. In accordance with the pulse signal, the system controller 71 knows the output direction of the measurement light by the scanner 4.

The slit interval of the slit plate 15a constituting the scanning angle detector 15 is defined so as to be the interval different from the others, at the predetermined reference position of the rotating body, namely, the position where the reference light is introduced from the opening 10 to the light receiver 5 as mentioned above. Then, in accordance with the waveform of the pulse signal, the reference position is detected, and the number of the pulses from the reference position is counted, thereby calculating the rotation angle from the reference position.

Figure 5:
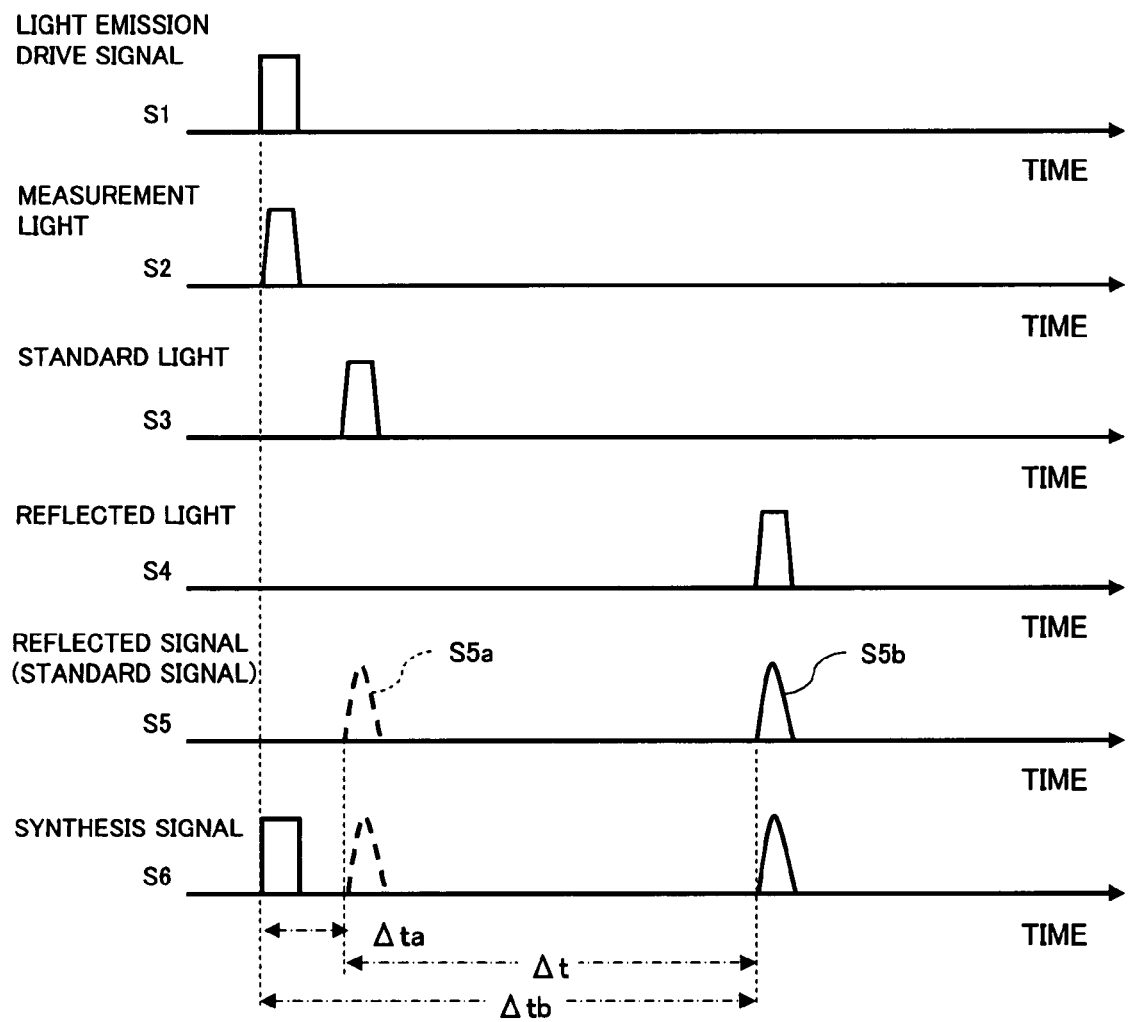
FIG. 5 is an explanation view showing timings of a photo signal waveform and an electric signal waveform in the scanning type distance measuring apparatus of FIG. 1.

A signal processing algorism will be described below with reference to a timing chart shown in FIG. 5.

When a measurement timing signal is inputted to a pulse signal generator 723 (refer to FIG. 6) of the signal processor 72 from the system controller 71 calculating the measurement timing in accordance with the pulse signal outputted by the scanning angle detector 15, the pulse signal generator 723 outputs a conversion start signal to the AD converter 73 at a predetermined timing with the measurement timing signal as a standard. Also, a light emission drive signal S1 of a predetermined duty ratio is outputted to the light projector 3, at the slight delay from the conversion start signal.

The light emitting device 3a is driven in synchronization with the light emission drive signal S1, and a pulse-shaped measurement light S2 is outputted. In short, the light emission intensity of the measurement light S2 is controlled on the basis of the duty ratio of the light emission drive signal S1 and the drive current of the light emitting device, and the light emitting device 3a is intermittently driven at the same cycle as the measurement timing signal outputted at a predetermined cycle.

When the light emitting device 3a is driven at the standard position, a part of the measurement light S2 is detected through the foregoing reference optical path by the light receiver 5 as the reference light S3, and a reference signal S5a is generated. Then, when the measurement light S2 is outputted from the light transmitting window 2a1 through the reference position to the measurement target space, the reflected light S4 from the measurement target object is detected by the light receiver 5, and a reflected signal S5b is generated.

The light emission drive signal S1 and the reference signal S5a or the reflected signal S5b are additionally processed by the synthesizing circuit, and a synthesis signal S6 where the light emission drive signal S1 and the reference signal S5a or the reflected signal S5b are continuous on the time axis is generated and inputted to the AD converter 73.

The analog synthesis signal S6 is sampled at a predetermined sampling frequency fs by the AD converter 73 and converted into the digital signal and outputted to the signal processor 72.

The signal processor 72 calculates a time difference $\Delta$ta between the light emission drive signal S1 and the reference signal S5a and a time difference $\Delta$tb between the light emission drive signal S1 and the reflected signal S5b in accordance with the digitally converted synthesis signal. The system controller 71 calculates the distance and direction from the measurement target object, on the basis of a difference $\Delta$t between the time differences $\Delta$ta, $\Delta$tb calculated by the signal processor 72 and the signal input from the scanning angle detector 15.

In short, on the basis of the time difference $\Delta$ta once detected at the reference position while the scanner 4 carries out one scan, the time difference $\Delta$tb detected during the one scan is compensated, which removes the error factors that are caused by the variation such as the response delay of the light emitting device 3a or the light receiving element 5a and the variation resulting from the machine difference of the apparatus.

Figure 6:
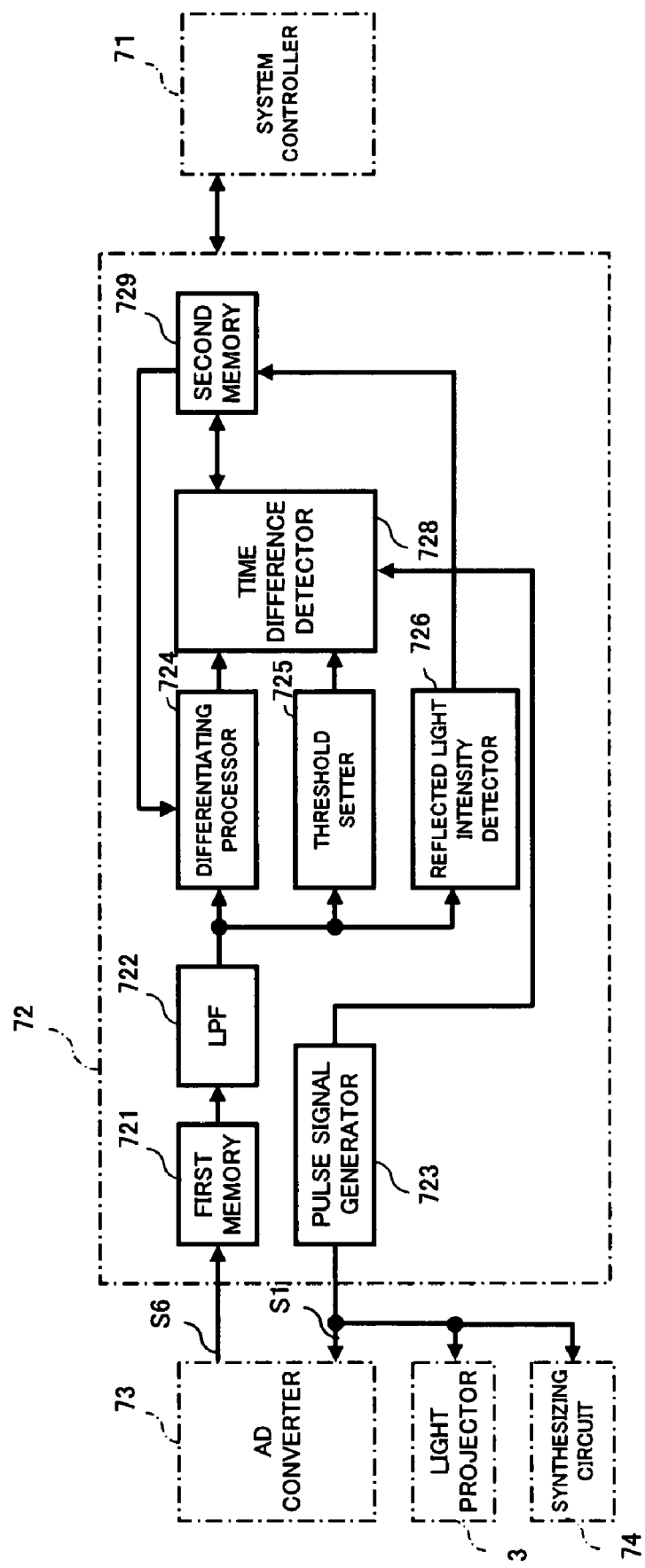
FIG. 6 is a block configuration view of a signal processor shown in FIG. 3.

The configuration and operation of the signal processor 72 will be described below in detail. As shown in FIG. 6, the signal processor 72 contains a first memory 721, a low pass filter 722, a differentiating processor 724 for differentiating each of the light emission drive signal S1 and the reference signal S5a or the reflected signal S5b, a threshold setter 725, a reflected light intensity detector 726, a time difference detector 728 for calculating the time difference $\Delta$t from the differentiated light emission drive signal S1 and reference signal S5a or reflected signal S5b, a second memory 729 for storing the various calculation results, and a pulse signal generator 723 for generating the light emission drive signal S1. Here, as the memory, the semiconductor memory of RAM and the like is used.

The first memory. 721 stores transiently in time series the digital signal converted by the AD converter 73. The digital signal read from the first memory 721 is sent to the differentiating processor 724 and the like after its high frequency noise components are removed by the low pass filter 722.

The differentiating processor 724 differentiates the output signal S5, which includes the light emission drive signal S1 and the reference signal S5a or the reflected signal S5b that are passed through the low pass filter 722, and outputs to the time difference detector 728.

Figure 8:
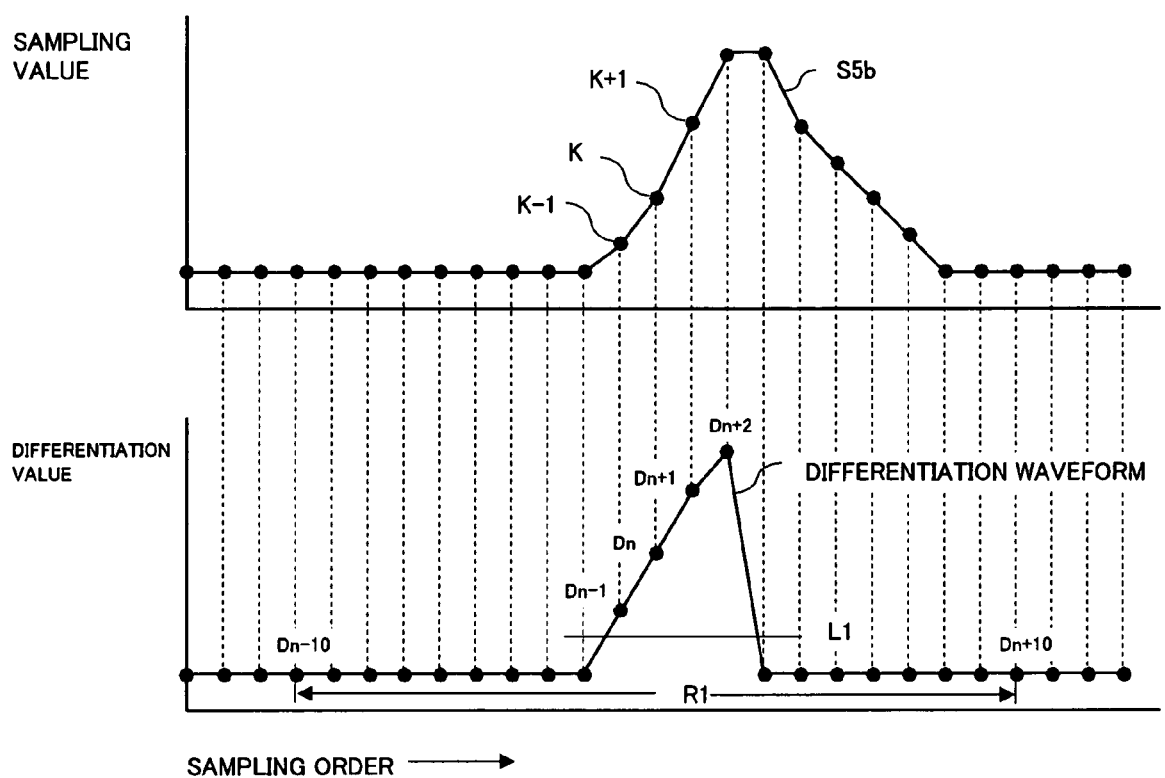
FIG. 8 is an explanation view of an integrating process and a gravitational center position calculating process.

Specifically, for the reflected signal S5b shown in FIG. 8, a difference between a K-th (K is a natural number indicating a sampling order) sampling value and a (K−1)-th sampling value is determined for each K, and that value is calculated as the differentiation signal shown in FIG. 8. By the way, this embodiment is designed such that if the difference value becomes negative, it is rounded to zero, and only the positive region is extracted.

The threshold setter 725 subtracts the minimum level from the maximum level of the signal prior to the generation of the light emission drive signal S1, among the digital output signals S5 passed through the low pass filter 722 and calculates a first measurement threshold L1 to detect the reference signal S5a or reflected signal S5b and then calculates the average level between the signals prior to the generation of the light emission drive signal S1, as a second measurement threshold L2 corresponding to an offset value.

In short, between the output of the conversion start signal and the output of the light emission drive signal S1, without any detection of the reference light and the reflected light, the signal where the noise signal caused by slight external disturbance light is superimposed on an offset level is sampled. Thus, the offset level and the noise level are calculated meanwhile. The calculated first measurement threshold L1 is outputted to the time difference detector 728, and the first and second measurement thresholds L1, L2 are outputted to the reflected light intensity detector 726.

Figure 7:
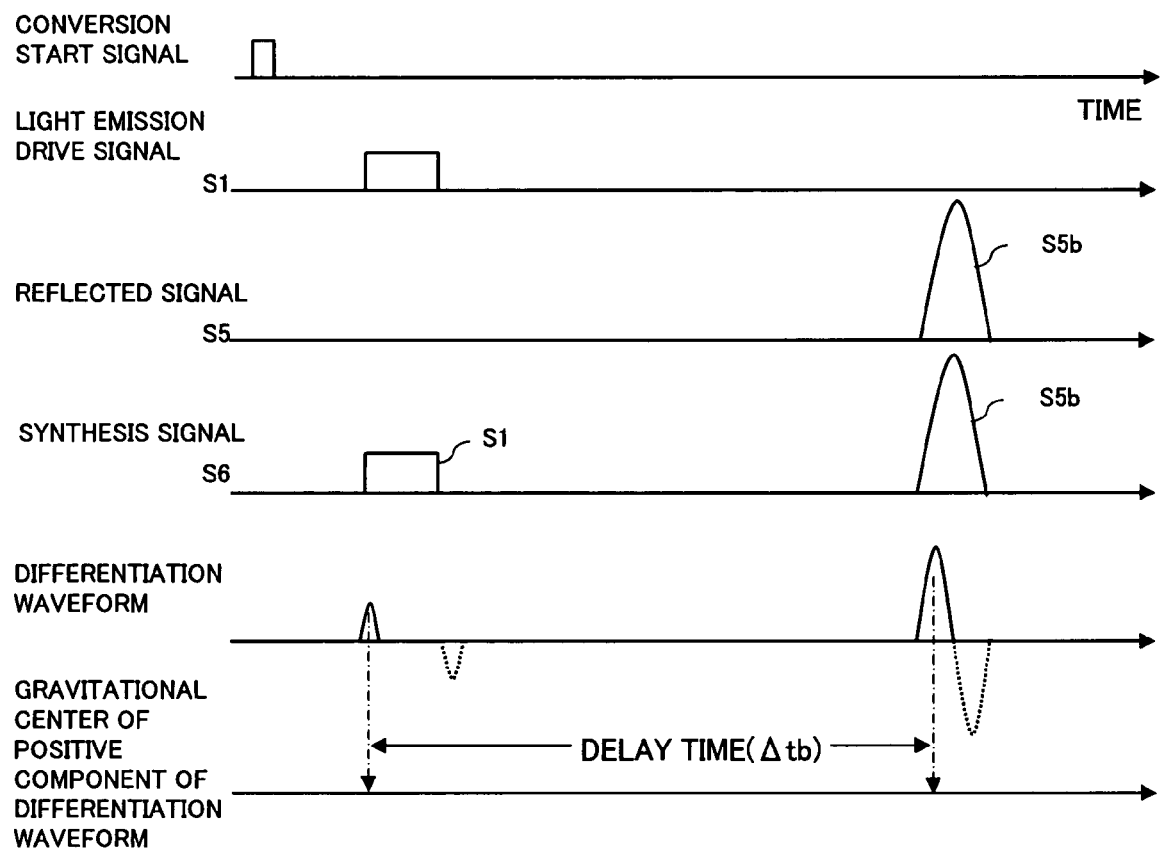
FIG. 7 is an explanation view of a signal processing to calculate a delay time.

The time difference detector 728 extracts the signal component of a region, which is greater than the first measurement threshold L1, from the differentiation signal inputted from the differentiating processor 724 and calculates the position of the gravitational center of the positive region (the solid portion of the differentiation waveform shown in FIG. 7) as the rise timing and determines the time difference $\Delta$ta of the rise timing between the light emission drive signal S1 and the reference signal S5a or the time difference $\Delta$tb of the rise timing between the light emission drive signal S1 and the reflected signal S5b and then stores the result in the second memory 729. Here, the time difference $\Delta$ta is calculated when the scanner 4 is located at the reference position, and the time difference $\Delta$tb is calculated when in the scanner 4, the reflected light from the measurement target space is detected.

When this is specifically explained by exemplifying the reflected signal S5b, as shown in FIG. 8, the sampling point that continuously exceeds the first measurement threshold L1 two times in the differentiation signal is detected, and a differentiation signal value Dn of the point that exceeds the first measurement threshold L1 at the second time is assumed to be a center, and for example, 10 sampling points (n−10 to n+10) that are forwardly and backwardly continuous are assumed to be a gravitational center calculation range R1, and a gravitational center P is calculated in accordance with the equation indicated in (Formula 3). In short, the gravitational center P is calculated as the time information from the sampling point (n−10). Since the foregoing process is performed on even the reference signal S5a, the respective gravitational centers P are calculated.

$$P = \frac{D_{n-10} \cdot (n-10) + D_{n-9} \cdot (n-9) + \ldots + D_{n+10} \cdot (n+10)}{D_{n-10} + D_{n-9} + \ldots + D_{n+10}} \quad \text{(Formula 3)}$$

Typically, the reflected light intensity is varied depending on the refection property of the measurement target object. Thus, when the rise timing of the reflected signal S5b is determined as the timing that exceeds a predetermined threshold, even if the reflected lights are inputted to the light receiver 5 at the same timing, the rise properties are different depending on the light intensity and a slight error is generated. However, when the reflected signal S5b is differentiated and it is determined as the gravitational center of the positive region, even if the light intensity is different, it is determined as the approximately equal value.

The system controller 71 calculates a distance L from the measurement target object by using the equation indicated in (Formula 4), in accordance with a delay time $\Delta$t where a delay time $\Delta$ta is subtracted from a delay time $\Delta$tb stored in the second memory 729 and compensated, and then determines the direction where the measurement target object exists, in accordance with the signal input from the scanning angle detector 15 at that time. By the way, C of (Formula 4) indicates the light speed.

$$L = \Delta t \cdot C/2 \quad \text{(Formula 4)}$$

The thus-determined distance L from the measurement target object has the value where the error factors caused by the variation, such as the response delay of the light emitting device 3a or light receiving element 5a and the variation resulting from the machine difference of the apparatus are removed. However, the rise timing of the reflected signal S5b determined by the foregoing algorism is determined in accordance with the output signal of the amplifying circuit 50 after it is clamped by the diode D. Thus, this includes the error caused by the clamping operation.

So, the reflected light intensity detector 726 functioning even as the integration processor as mentioned above calculates an integration value S7 of the reflected signal S5b outputted by the transformation impedance amplifying circuit 50, and its result is stored in the second memory 729.

Figure 9:
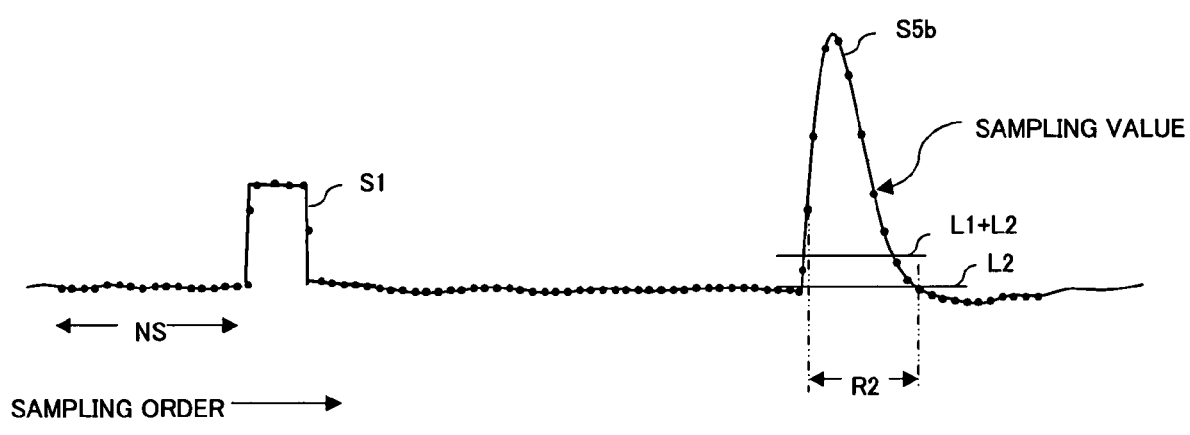
FIG. 9 is an explanation view of a sampling process and an integrating process for a reflected signal.

As shown in FIG. 9, the reflected light intensity detector 726 performs the integrating process on the reflected signal S5b appearing next to the light emission drive signal S1, among the output signals S5 passed through the low pass filter 722, as an integration range R2 until the sampling value, which firstly becomes lower than the second measurement threshold L2, from the sampling value immediately before it firstly exceeds the addition value of the first measurement threshold L1 and the second measurement threshold L2.

At the time of the integrating process, since the integration value of the region that is equal to or less than the second measurement threshold L2 is subtracted from the integration value corresponding to the integration range R2, the offset error is removed. Here, in order to remove the offset error, it is possible to integrate the value where the second measurement threshold L2 is subtracted from the sampling value in the integration range R2.

At the time of the integrating process, the sum of products between the respective sampling values in the integration range R2 and the sampling interval may be determined, or it is simplified and the respective sampling values in the integration range R2 may be added.

The system controller 71 reads the integration values stored in the second memory 729 and compensates the calculated distance L, in accordance with the compensation table value indicating the relation between a preset integration value and a compensation distance. In short, the system controller 71 functions as the distance compensator for compensating the distance L in accordance with the output of the integration processor.

Figure 10A:
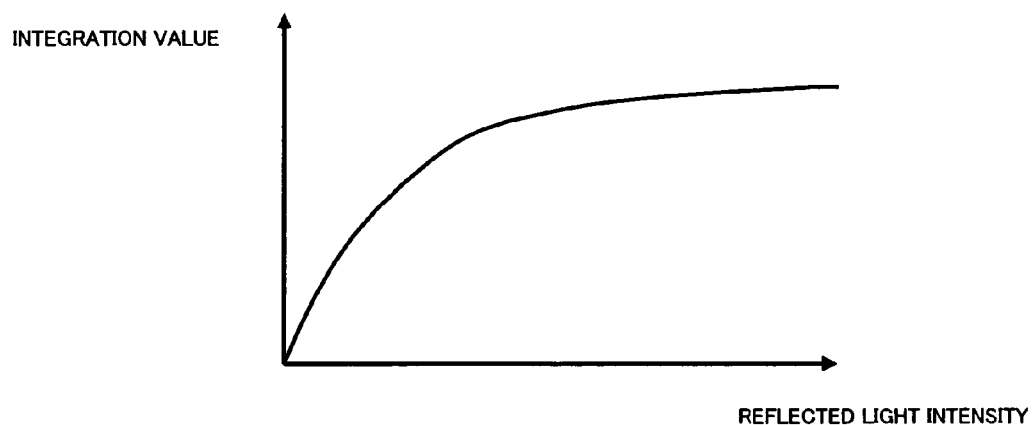
FIG. 10A is an explanation view showing relative relations between a reflected light intensity and an integration value.
Figure 10B:
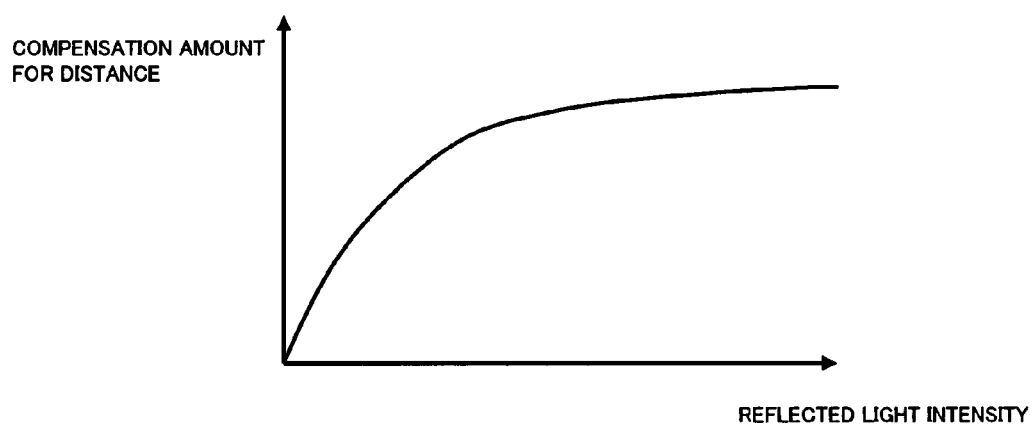
FIG. 10B is a property view showing a relation between the reflected light intensity and a distance compensation amount.
Figure 10C:
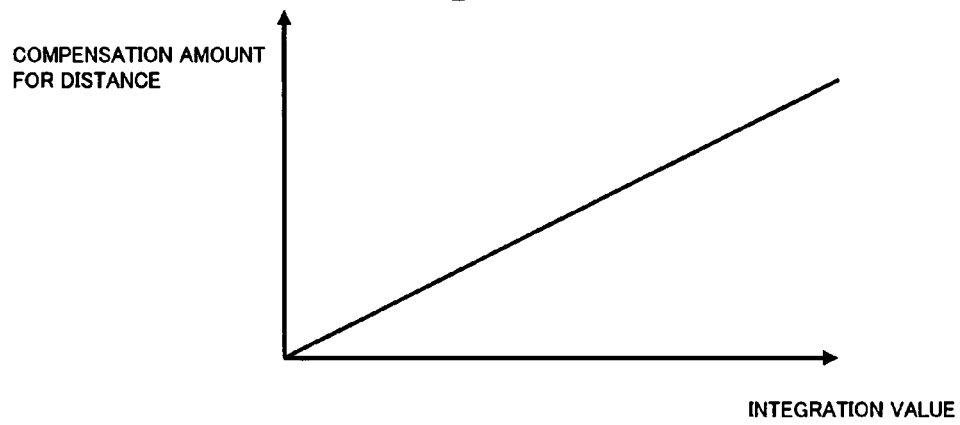
FIG. 10C is an explanation view showing a relation between the integration value and the distance compensation amount for explaining properties of the reflected light intensity and the distance compensation amount.

FIG. 10A, FIG. 10B and FIG. 10C show the respective relative relations between the reflected light intensity, the integration value and the compensation amount for the distance, which are checked by an experiment.

FIG. 10A shows the relative relation between the input light intensity and the integration value, FIG. 10B shows the relation between the reflected light intensity and the compensation amount for the distance, and FIG. 10C shows the relation between the integration value and the compensation amount for the distance. The integration value sharply rises with the slight increase in the region where the reflected light intensity is small. However, in the region where the reflected light intensity is great, even if it is greatly increased, its inclination is extremely small. Also, the reflected light intensity and the compensation amount for the distance exhibit the similar tendency. Thus, in the entire system, the integration value and the compensation amount of the distance indicate the linear relation.

According to the experiment, due to the present invention, even in the case of the reflected light from the object having the difference of the reflectance of 1,000,000 times or more between a black non-reflective sheet and a mirror reflection, it is verified that the distance can be calculated where the detection error is constant and stable.

By the way, the system controller 71 may be designed to calculate the distance L after the compensation for the delay time $\Delta$t in accordance with the compensation table value indicating the relation between the integration value and the delay time $\Delta$t, in addition to the compensation for the distance L calculated in accordance with the delay time $\Delta$t, on the basis of the integration value.

Also, in the above-mentioned embodiment, the rise timings of the respective signals S1, S5a and S5b are explained so as to be determined on the basis of the gravitational center of the positive region of the integration signal. However, the calculation to determine the rise timing is not limited thereto. For example, it is possible to employ a method that calculates the gravitational center on the time axis in the rise portions of the respective signals S1, S5a and S5b, or a method that performs a straight approximation or multinomial approximation on the rise portion of the signal and calculates the position of the intersection between the approximate line and the offset level of the output signal S5.

In the above-mentioned embodiment, the distance measuring apparatus having the reference optical path is explained where in such a way that the rotation axis of the scanner 4 and the optical axis of the measurement light outputted by the light projector 3 is parallel, the light projector 3 and the scanner 4 are arranged and the part of the measurement light outputted by the light projector 3 at the particular rotation position of the scanner 4 is introduced as the reference light to the light receiver 5. However, the reference optical path of the distance measuring apparatus to which the present invention is applied is not limited to such configuration. Then, this can be attained by the other configurations.

For example, in such a way that the rotation axis of the scanner 4 and the optical axis of the measurement light outputted by the light projector 3 are coincident, the light projector 3 and the scanner 4 are arranged, and the reflection member where at the reference position, the measurement light is reflected by the light receiver is installed on the inner wall of the housing 2, and the reference optical path may be consequently configured.

Figure 11:
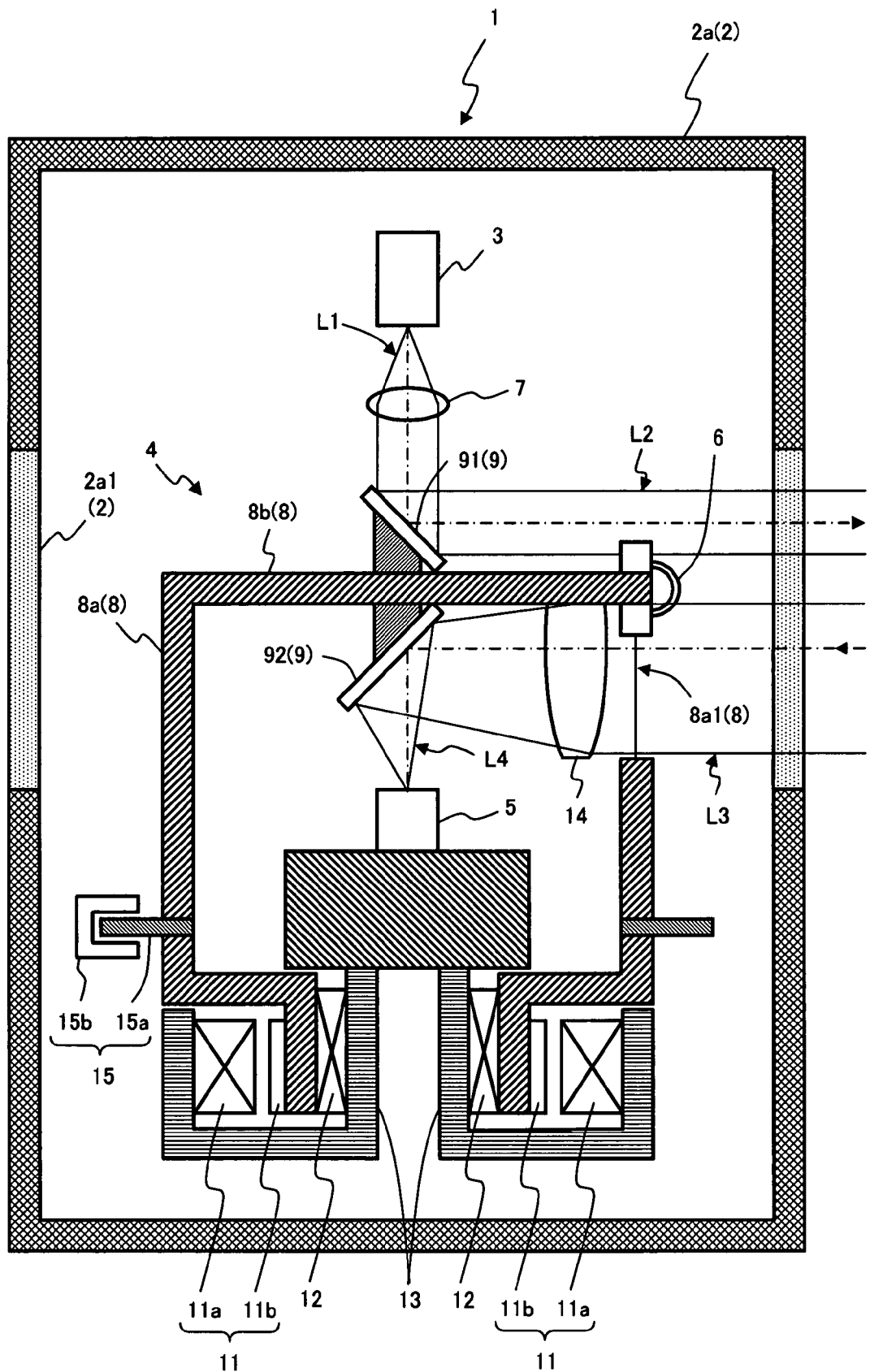
FIG. 11 is a schematic longitudinal sectional view showing another embodiment and showing an entire configuration of a scanning type distance measuring apparatus.
Figure 12A:
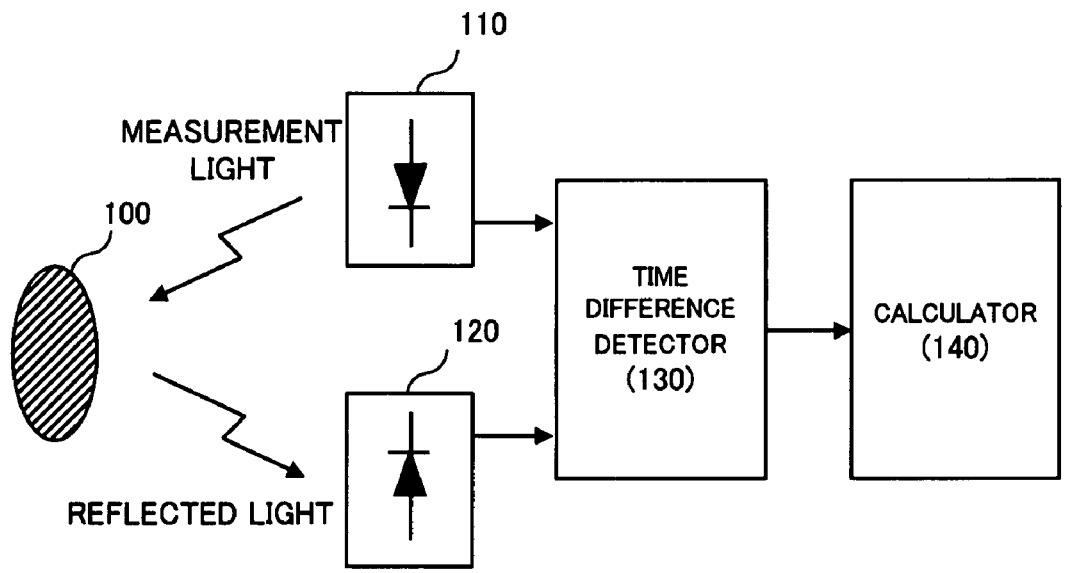
FIG. 12A is an explanation view of a distance measuring principle based on a TOF method.
Figure 12B:
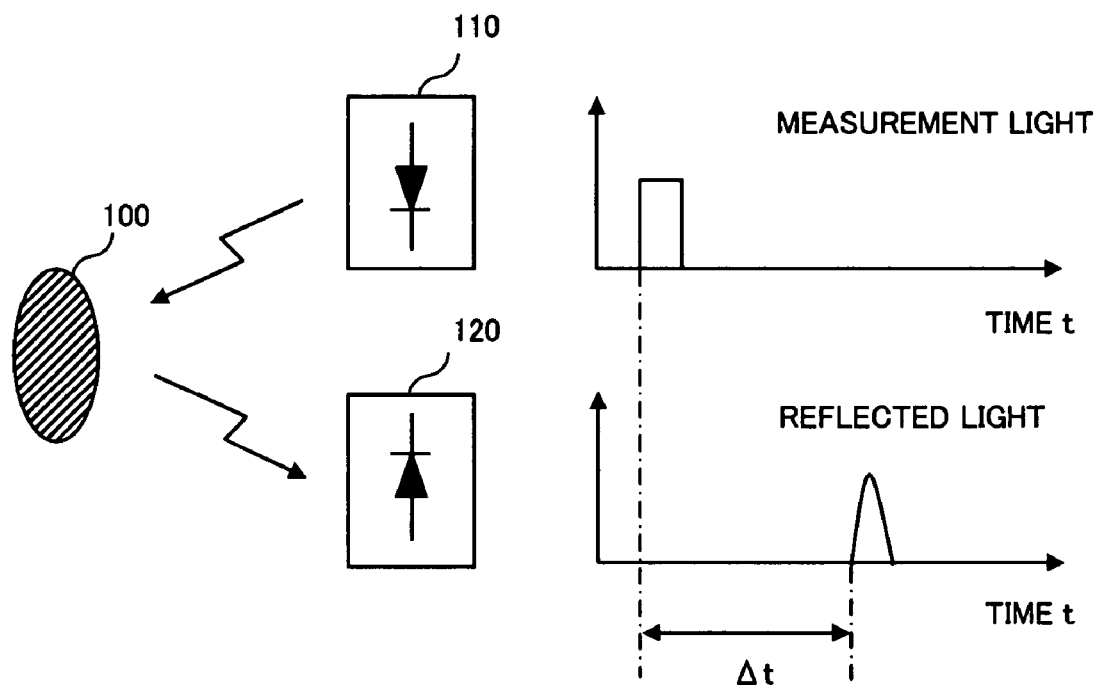
FIG. 12B is an explanation view of a distance measuring principle based on a TOF method.
Figure 13A:
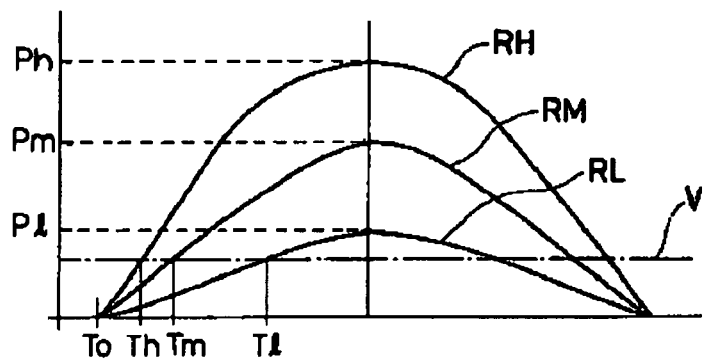
FIG. 13A is an explanation view of a conventional technique.
Figure 13B:
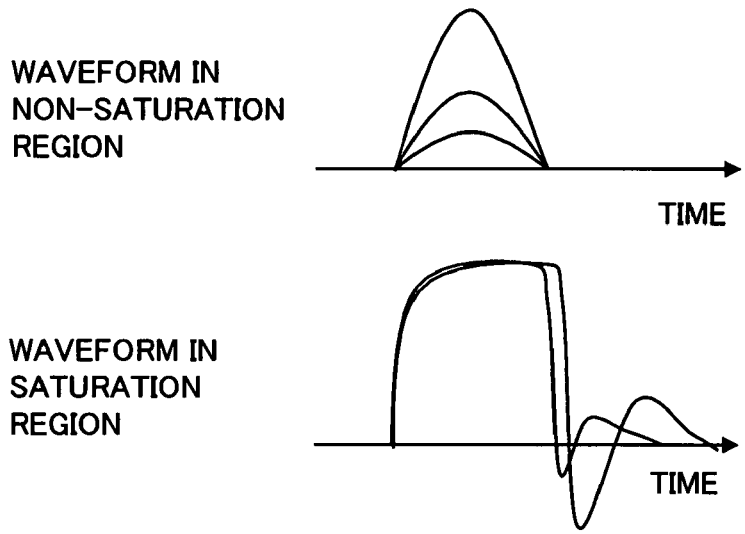
FIG. 13B is an explanation view of a conventional technique.
Figure 13C:
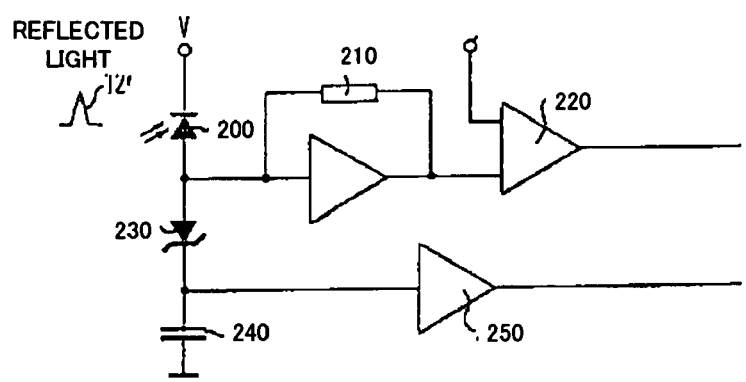
FIG. 13C is an explanation view of a conventional technique.

Moreover, as shown in FIG. 11, in such a way that the rotation axis of the scanner 4 and the optical axis of the measurement light outputted by the light projector 3 are coincident, the light projector 3 and the scanner 4 are arranged, and a light introduction member 6 such as an optical fiber or the like, which is rotated integrally with a rotating mechanism, and a part of the measurement light reflected by a light projection mirror is introduced to a light receiving mirror may be contained. In this case, it is possible to attain the distance measurement of a high precision in the entire angle of 360 degrees. By the way, when such configuration is employed, both of the reference light and the reflected light are measured at the same scanning position. Thus, a delay time $\Delta t$ is determined in accordance with the time difference of the rise timing between the reference light and the reflected light.

In the above-mentioned embodiment, the case where the present invention is applied to the scanning type distance measuring apparatus is explained. However, the application target of the present invention is not limited to the scanning type distance measuring apparatus. If it is the distance measuring apparatus based on the TOF (Time of Flight) type, that target is not limited.

The above-mentioned embodiment is one embodiment of the present invention. Then, the specific configurations of the respective units, such as the shapes, materials, circuit configurations and the like, may be naturally changed as the suitable designs within the range that exhibits the action effect according to the present invention.

What is claimed is:

1. A distance measuring apparatus comprising:
   a light source to output a pulsed measurement light towards a measurement target object;
   a light receiver to detect a reflected light from said measurement target object;
   a time difference detector to detect a delay time between an output timing of said measurement light and a detected timing of said reflected light by said light receiver;
   a calculator to calculate a distance from said measurement target object on the basis of the delay time detected by said time difference detector,
   said light receiver being provided with a photodiode to photo-electrically convert said reflected light, a diode which is connected in series to said photodiode and configured to clamp a light current generated in said photodiode and an amplifying circuit to amplify an output of said photodiode;
   an integration processor to integrate an output of said amplifying circuit; and
   a distance compensator to compensate said delay time or said distance in accordance with an output of said integration processor,
   wherein, said diode inputs an opposite direction current caused by diffusion of minor carriers accumulated in a junction capacitor of said diode with a reverse recovery property to said amplifying circuit when said reflected light is lost and said photodiode is turned off.

2. The distance measuring apparatus according to claim 1, wherein
   said integration processor is provided with an analog/digital converter to convert the output of said amplifier at a predetermined interval until a reverse recovery time of said diode after a disappearance of said reflected light from the detection of said reflected light, and an adding processor for adding the output of said analog/digital converter.

3. The distance measuring apparatus according to claim 2, wherein
   said time difference detecting circuit is configured to calculate the detection timing of said reflected light in accordance with .a rise property of said reflected light that is converted by said analog/digital converter.

4. A distance measuring apparatus comprising a light source to output a pulsed measurement light towards a measurement target object;
   a light receiver to detect a reflected light from said measurement target object;
   a time difference detector to detect a delay time between an output timing of said measurement light and a detected timing of said reflected light by said light receiver;
   a calculator to calculate a distance from said measurement target object on the basis of the delay time detected by said time difference detector,
   said light receiver being provided with a photodiode to photo-electrically convert said reflected light, a diode which is connected in series to said photodiode and configured to clamp a light current generated in said photodiode and an amplifying circuit to amplify an output of said photodiode;
   an integration processor to integrate an output of said amplifying circuit; and
   a distance compensator to compensate said delay time or said distance in accordance with an output of said integration processor, wherein
   said integration processor is provided with an analog/digital converter to convert the output of said amplifier at a predetermined interval until a reverse recovery time of said diode after a disappearance of said reflected light from the detection of said reflected light, and an adding processor for adding the output of said analog/digital converter.

5. The distance measuring apparatus according to claim 4, wherein said time difference detecting circuit is configured to calculate the detection timing of said reflected light in accordance with a rise property of said reflected light that is converted by said analog/digital converter.

* * * * *